INVENTOR.
Frank W. Hochmuth
BY
R. F. Bryant
ATTORNEY 3,118,429
POWER PLANT IN WHICH SINGLE CYCLE GAS TURBINE OPERATES IN PARALLEL WITH DIRECT FIRED STEAM GENERATOR
Frank W. Hochmuth, West Simsbury, Conn., assignor to Combustion Engineering, Inc., Windsor, Conn., a corporation of Delaware
Filed Nov. 8, 1961, Ser. No. 150,931
3 Claims. (Cl. 122—7)

This invention relates to a power plant whereby the hot exhaust gases from a gas turbine or other process having hot exhaust products are utilized in conjunction with a steam generator.

When a gas turbine is installed adjacent to one or more direct fired steam generators, the thermal efficiency of the combined operation can be improved if a means is provided for utilizing the heat contained in the gas turbine exhaust. This invention relates to a novel apparatus for reducing the temperature of the gas turbine exhaust when such a reduction is desirable to make the gas suitable for use to support combustion of a fuel. In this system, the heat extracted from the exhaust is transferred directly to the boiler water of the steam generator and does not affect the temperature of the feed water, thereby having no deleterious effect upon the efficiency of any feed water type economizers which might be installed in the generator; nor does it present any additional control problems.

It is an object of this invention to cool down the exhaust gases from a gas turbine or other process by first passing it through a suitable heat exchanger, and thereafter introducing such cooled gases into the boiler furnace.

It is a further object of this invention to provide a system whereby the gas introduced into the steam generator furnace to support combustion is always at approximately the same temperature, regardless of whether or not the gas turbine is in operation.

Figure 1:
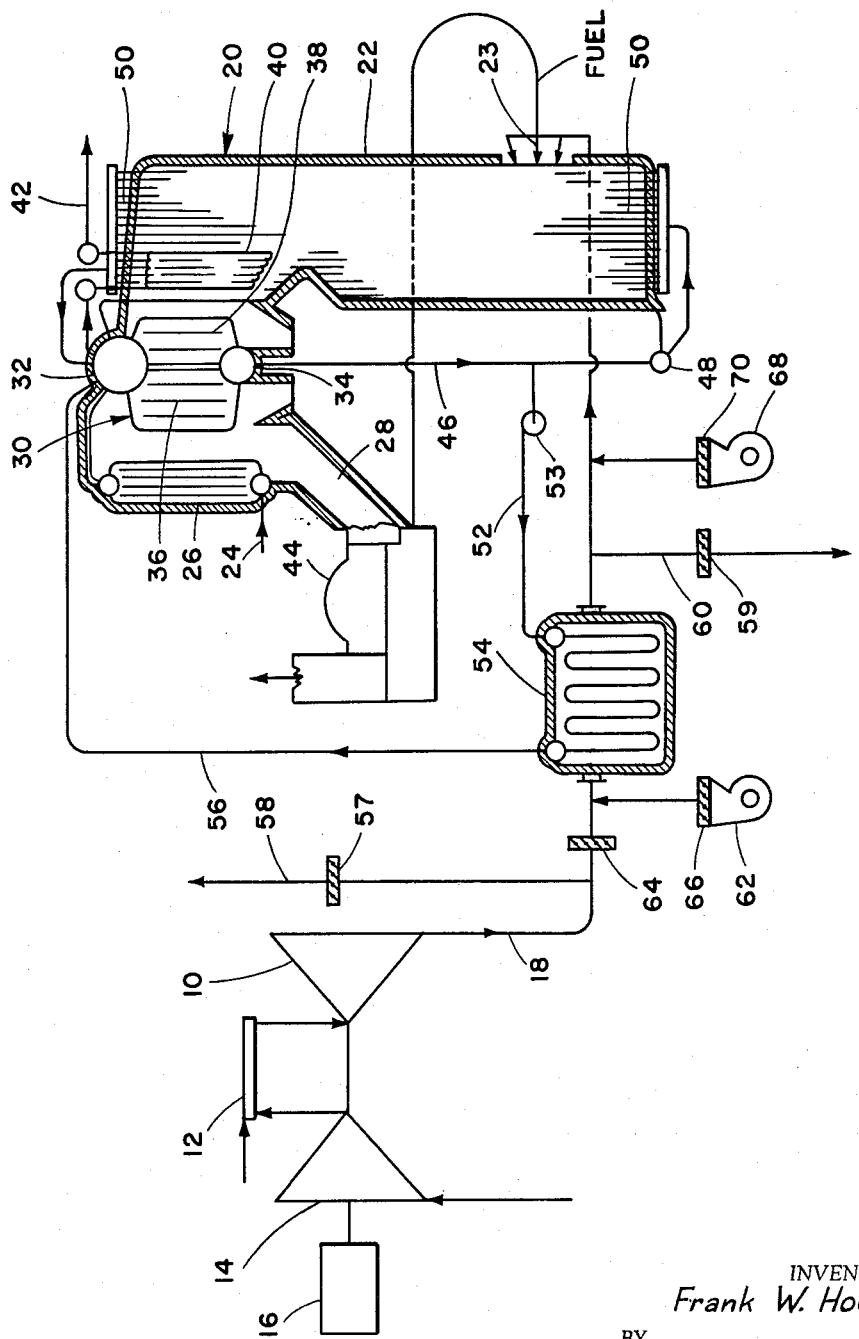
Figure 2:
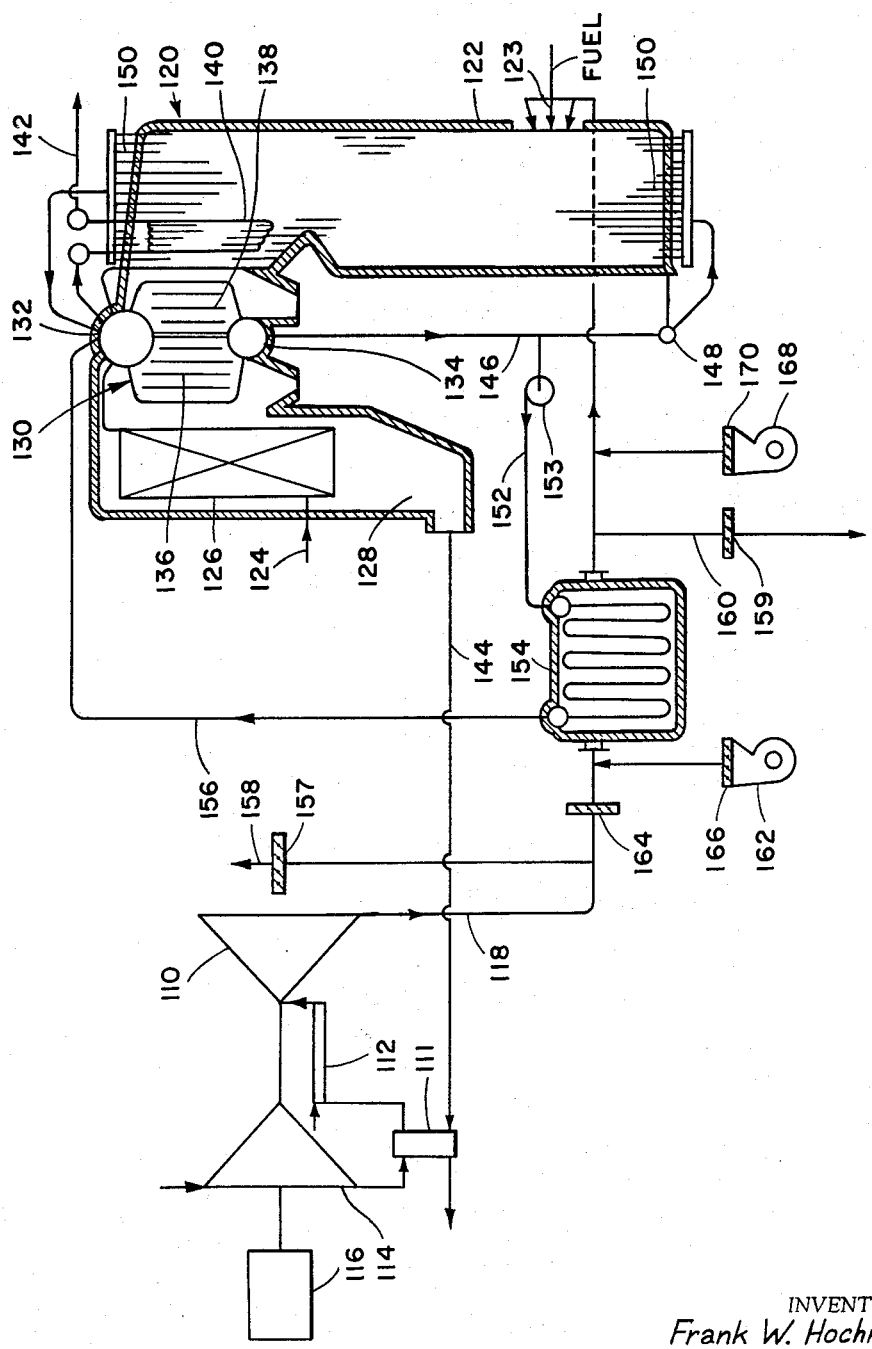

The invention will be described with reference to the accompanying drawings, wherein FIGURE 1 is a diagrammatic view of one form of my invention; and FIGURE 2 is a similar diagrammatic view of a second form of my invention.

Looking now to FIGURE 1, 10 designates a gas turbine which is supplied by hot gases from combustion chamber 12. Air enters compressor 14 and passes on to combustion chamber 12 where fuel is also added and the combustion products pass on to the gas turbine 10. Turbine 10 drives compressor 14 and also the electric generator 16.

The hot exhaust gases from turbine 10 pass by means of duct 18 to the furnace 22 of boiler or steam generator 20, which generator as illustrated is associated with a chemical recovery unit utilizing black liquor as the furnace fuel. Fuel burning means 23 are provided for the black liquor fuel, and the exhaust gases from gas turbine 10 supply all, or part of the oxygen necessary for combustion of such fuel.

Feed water is supplied to the boiler by means of pipe 24 and passes through economizer 26 which is located in heat exchange relationship with the hot combustion gases passing through gas pass 28. The water leaving economizer 26 passes on to steam and water drum 32 of the drum arrangement 30. The drum arrangement 30, which is the vapor generating section of the boiler, also contains water drum 34. Water flows from drum 32 to drum 34 by means of downcomers 36 thereby picking up heat from the hot gases, and a steam and water mixture flows back to the steam release drum 32 by way of risers 38. The flow through this circuit as shown is caused by natural circulation, the water in downcomers 36 being of a greater density than the steam and water mixture contained in risers 38. An alternative method would be to utilize a pump to maintain this circulation.

The steam entering upper drum 32 is separated from the water and flows to superheater 40, and from there passes on to a steam turbine (not shown) by way of pipe 42. The exhaust gases from gas pass 28 flow through direct contact evaporator 44 where the temperature of such gases is reduced to a point where they can be economically vented to the atmosphere, for example 300° F. The heat absorbed in the evaporator is utilized in evaporating the black liquor which is used as the fuel in furnace 22.

Water leaves drum 34 by means of pipe 46 and flows to header 48 and from there enters water wall tubes 50 which completely line the four walls of the furnace 22. The water from tubes 50 then flows back to drum 32. Water from pipe 46 is also pumped by means of circulating pump 53 through pipe 52 to heat exchanger 54 which is located in the duct 18 through which the exhaust from gas turbine 10 passes. After absorbing heat from the hot exhaust gases contained within duct 18, where some steam is formed, the water and steam mixture flows through pipe 56 back to steam release drum 32 of the vapor generating section.

A vent line 58 branches off from duct 18 upstream of the heat exchanger 54, and this line 58 contains a set of dampers 57 by means of which the vent line can be closed when desired. A second vent line 60, also containing a set of dampers 59 branches off duct 18 downstream of the heat exchanger 54.

Two forced draft fans 62 and 68 are located with their outlets connected to duct 18 such that they can supply air from the atmosphere to this duct when it becomes necessary. The lines connecting the outlets of such fans to duct 18 contains dampers 66 and 70 so that these lines can also be closed. A set of dampers 64 is also contained within duct 18 upstream of the first forced draft fan 62.

The operation of this apparatus will now be described. The hot exhaust gases from gas turbine 10, which may be on the order of 850° F. pass through duct 18 to the steam generator furnace 22 where the oxygen content thereof is used to support combustion of the black liquor fuel supplied to burner 23. Steam generators are generally not designed such that the combustion air can be supplied to the furnace at high temperatures such as 850° F. For this reason these gases first pass in heat exchange relationship with the water in heat exchanger 54 to lower the temperature thereof. The water flowing from drum 34 to heat exchanger 54 is at a much lower temperature than 850° F., for example 490° F. By passing the exhaust gases in heat exchange relationship with the water in heat exchanger 54 it is possible to reduce the gas temperature to within approximately 50° of the temperature of the water flowing through the heat exchanger, and thus the gases leaving the heat exchanger are at approximately 540° F. Thus it can be seen that this apparatus can be used to keep the stream boilers hot and up to full pressure even if no fuel were being burned in furnace 22, by means of heat exchanger 54.

In some instances it is desirable to have the steam generator 20 in operation when the gas turbine 10 has been shut down. When this occurs dampers 64 in duct 18 are closed, dampers 66 are opened, and forced draft fan 62 is actuated. Fan 62 is of such capacity that it can supply furnace 22 with all of the air necessary for complete combustion of the fuel being burned in burner 23. This air being supplied by means of fan 62 passes in heat exchange relationship with the water flowing through heat exchanger 54 prior to entrance into the furnace. In this manner the air is heated up to within 50° of the temperature of the water flowing to the heat exchanger 54, and thus such air passes on to furnace 22 at a temperature of approximately 440° F. Thus it can be seen that by the use of heat exchanger 54 positioned within duct 18, no further air preheater means for the combustion air being supplied to furnace 22 is necessary.

In the event gas turbine 10 is operating when the steam generator 20 is out of operation dampers 64 in duct 13 are closed, dampers 57 located in vent line 58 are opened, and thus the exhaust gases from turbine 10 can either be permitted to exhaust to atmosphere, or can be transported to another steam generator unit nearby and utilized in the same manner as it is for steam generator 20. If more gases are being exhausted from turbine 10 than are necessary for furnace 22, dampers 59 can be opened, and the excess allowed to pass through line 60 to another point of use. The purpose of forced draft fan 63 is to supply a small additional amount of air from the atmosphere to combine with the exhaust gases from gas turbine 10 when it is desired to temper or lower the temperature of the gases flowing to the furnace; or when the exhaust gases from gas turbine 10 is not of a sufficient quantity to meet the needs of furnace 22, then air can be added thereto so that the combined flow of exhaust gases and air flowing to the furnace contains a total weight of oxygen which will be sufficient to support combustion of the fuel. Generally, 400–500% excess air is supplied to combustion chamber 12 so that the percent of oxygen contained in the exhaust gases from gas turbine 10 is of a high order, for example 17 or 18%.

FIGURE 2 illustrates a system very similar to that shown in FIGURE 1 where the gas turbine exhaust is utilized in conjunction with a boiler other than a chemical recovery unit boiler, for example a utility boiler. In this embodiment hot gases are supplied to gas turbine 110, which drives electric generator 116, from combustion chamber 112 where air from compressor 114 along with fuel is burned. The exhaust from gas turbine 110 passes through duct 113 in heat exchange relationship with the water flowing through heat exchanger 154 and then enters furnace 122. These gases furnish all or part of the oxygen necessary to support combustion of the fuel supplied to burner 123. This fuel can be of any type, for example pulverized coal, oil, or gas. Feed water is supplied to the steam generator 120 by means of pipe 124, flows through economizer 126 located in gas pass 128, and from the economizer outlet it passes on to the steam and water drum 132 of the drum arrangement 130. A circuit is completed between drum 132 and water drum 134 by means of downcomers 136 and risers 138. Steam passes from drum 132 to superheater 140, and from there flows to a steam turbine by means of pipe 142.

Water flows from water drum 134 by means of pipe 146 to header 148 which supplies water to the water cooled tubes 150 which line all of the walls of furnace 122. Water is also circulated to heat exchanger 154 by means of pump 153 located in pipe 152. The mixture of steam and water leaving heat exchanger 154 flows through 156 back to steam release drum 132.

The exhaust gases leaving gas pass 128 pass through a heat exchanger unit 111 thus heating the compressed air flowing from compressor 114 to combustion chamber 112. In this manner the gases being exhausted to atmosphere are reduced to a suitably low temperature.

The operation of the system shown in FIGURE 2 is the same as that described in FIGURE 1. The exhaust gases from gas turbine 110 are first utilized to heat the water flowing through heat exchanger 154 and thereafter are passed on to furnace 122 to support combustion of the fuel burned in burner 123. When the gas turbine is not in operation and the steam generator 120 is, forced draft fan 162 supplies all of the air necessary to support combustion of the fuel in the furnace, this air first being heated by passing in heat exchange relationship with the water flowing through heat exchanger 154. Fan 168 can be actuated to add a small amount of air to the turbine exhaust when necessary.

While the invention has been described as utilizing the hot exhaust gases from a gas turbine, it is obvious that these hot gases could be supplied from some source other than a gas turbine. For example diesel engine exhaust or the exhaust from a chemical process plant could also be used. The only requirements are that the hot exhaust gases should be fairly clean, and have a sufficient concentration of oxygen to support combustion.

What I claim is:

1. A power plant comprising a steam generator, a furnace containing fuel burning means associated with said generator for burning fuel, said generator containing a vapor generating section, a source of hot gases containing oxygen, a first duct extending from said source to a region of combustion within the furnace, whereby said hot gases can support combustion of said fuel, heat exchange means having its inlet and outlet connected to said vapor generating section, said heat exchange means being positioned such that the fluid flowing therethrough is in heat exchange relationship with the hot gases flowing through said first duct, means for causing flow of fluid from the vapor generating section to the heat exchange means, and then back to the vapor generating section again, a second duct, a fan, one end of said second duct being connected to the outlet of said fan, and the other end of said second duct being connected to said first duct between said source of hot gases and said heat exchange means, the inlet of said fan being in communication with the atmosphere.

2. The power plant set forth in claim 1, including first damper means positioned in said second duct, and second damper means positioned in said first duct between the source of hot gases and the point where the first and second ducts connect.

3. The power plant set forth in claim 2, including a third duct, a second fan, one end of said third duct being connected to the outlet of said second fan, the other end of said third duct being connected to said first duct downstream of said heat exchange means, the inlet of said second fan being in communication with the atmosphere, and third damper means positioned in said third duct.

References Cited in the file of this patent

UNITED STATES PATENTS

| 2,401,285 | Woodward et al. | May 28, 1946 |
| 2,404,938 | Armacost et al. | July 30, 1946 |

FOREIGN PATENTS

| 426,516 | Great Britain | Apr. 4, 1935 |
| 621,954 | Great Britain | Apr. 25, 1949 |
| 715,807 | Great Britain | Sept. 22, 1954 |